United States Patent [19]

Katagi

[11] 4,164,739

[45] Aug. 14, 1979

[54] REDUCTION OF TARGET SHIFT IN COORDINATE CONVERTER

[75] Inventor: Kazuo Katagi, Woodland Hills, Calif.

[73] Assignee: RCA Corporation, New York, N.Y.

[21] Appl. No.: 854,833

[22] Filed: Nov. 25, 1977

[51] Int. Cl.² ........................... G01S 7/44; G01S 9/60
[52] U.S. Cl. .................................. 343/5 SC; 343/5 W
[58] Field of Search ............................ 343/5 SC, 5 W

[56] References Cited

U.S. PATENT DOCUMENTS

| | | | |
|---|---|---|---|
| 3,988,731 | 10/1976 | Young | 343/5 SC X |
| 4,106,021 | 8/1978 | Katagi | 343/5 SC X |
| 4,128,834 | 12/1978 | Katagi | 343/5 SC X |

Primary Examiner—T. H. Tubbesing
Attorney, Agent, or Firm—H. Christoffersen; Joseph D. Lazar; Raymond E. Smiley

[57] ABSTRACT

In a coordinate converter in which more than one input address corresponds to one output address (related to a specific location on a display screen) and in which input addresses can occur in either of two sequences, an apparatus is disclosed for changing the output addresses by a preselected amount only when the input addresses are received in one of the sequences. In the absence of apparatus for changing the output addresses, the image on the display screen shifts depending on the sequence in which the input addresses occur.

5 Claims, 5 Drawing Figures

REDUCTION OF TARGET SHIFT IN COORDINATE CONVERTER

CROSS REFERENCE TO RELATED PATENT APPLICATION

Of interest is U.S. patent application, Ser. No. 812,363, filed on July 1, 1977 (now U.S. Pat. No. 4,106,021), by K. Katagi, assigned to the same assignee as the instant application.

BACKGROUND OF THE INVENTION

In display systems involving coordinate converters of the digital type there is typically not a one-to-one correspondence between the number of input locations and output locations. Thus, for example, in a polar-to-rectangular coordinate converter system there may be two or more azimuth and range locations which are converted to a single X and Y location. If the locations in the rectangular coordinate system are storage location addresses and the data associated with each of the polar locations corresponding to a common rectangular coordinate system location are not identical, the data stored at a particular storage location address will be a function of the sequence in which the polar coordinate locations are received. One solution to this problem is to provide apparatus for averaging the values of the various elements of data destined for a given storage location and store only the average. Another solution to this problem is to store only the highest (or lowest) value of the various elements of data destined for a given storage location. Each of the solutions is accomplished with extensive and costly hardware that, in addition, incurs a time delay in the signal passage through the hardware.

SUMMARY OF THE INVENTION

A system for producing from signals representing first addresses in a first coordinate system corresponding signals representing second addresses in a second coordinate system, which has fewer addresses than the first system, includes means receptive of the signals representing successive ones of the first addresses in either a first sequence or a second different sequence for producing corresponding signals representing the second addresses in accordance with the relation between the first and second coordinate systems, and for producing a signal representing a given second address for more than one first address. The system also includes means responsive to the signals representing the second addresses being received in the first sequence for producing a signal indicative thereof and also includes means responsive to the sequence indicative signal for changing the second addresses by a predetermined amount.

DETAILED DESCRIPTION OF A PREFERRED EMBODIMENT

Figure 1:
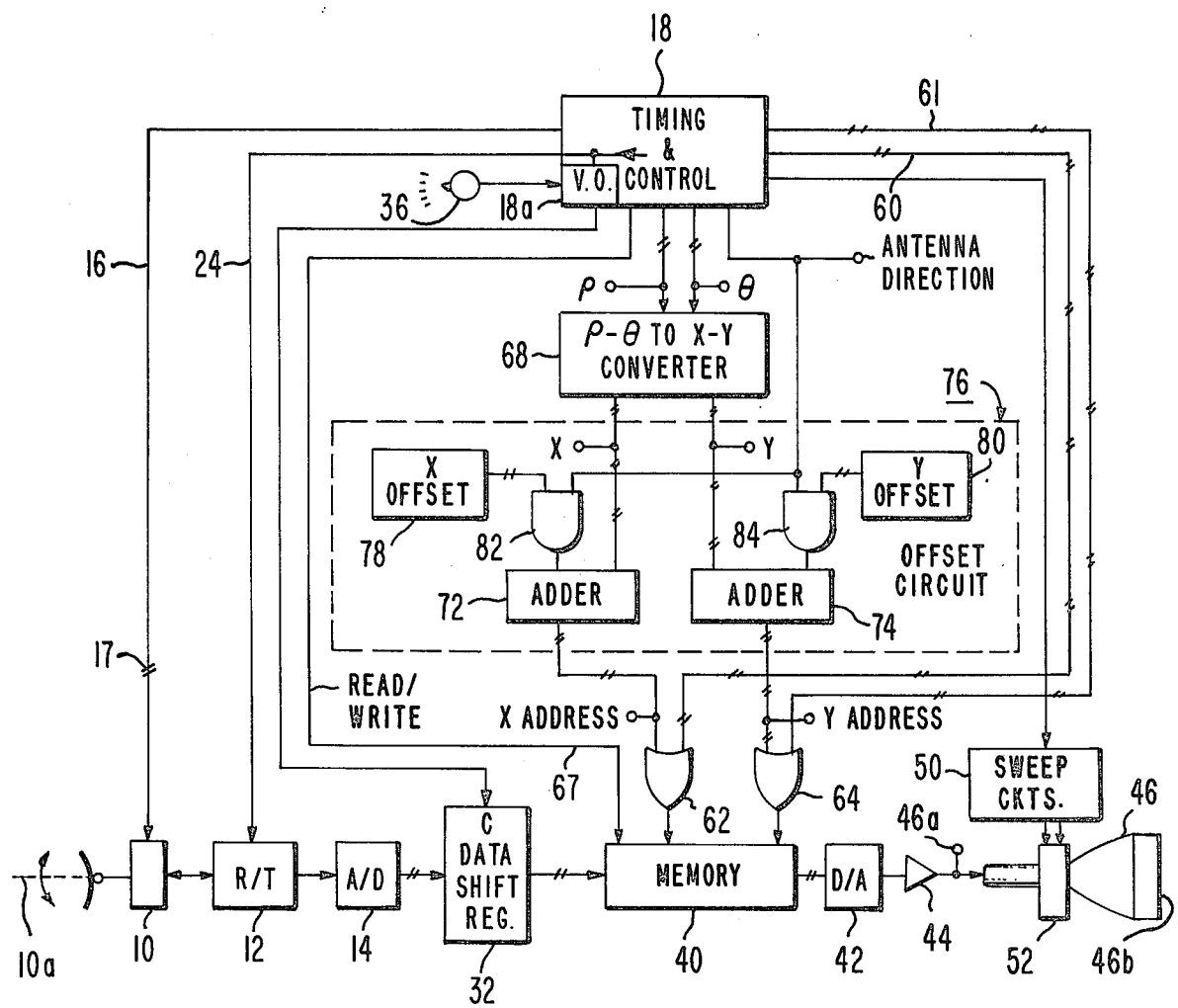
FIG. 1 is a digital weather radar system which includes the present invention.

In FIG. 1 a pivotal radar antenna 10 is coupled to a receiver/transmitter (RT) 12 which, in turn, is coupled to an analog-to-digital converter (AD) 14. The antenna, receiver/transmitter and analog-to-digital converter are all of standard design found in typical airborne radar units such as, for example, the PriMUS 30 weather radar system manufactured and sold by the RCA Corporation, Van Nuys, Calif. A multiconductor cable 16 from a master timing and control circuit (TC) 18 is coupled to antenna 10 to advance the antenna to succeeding angular positions. (Multiconductor cables, such as 16, are designated by crosshatch lines, such as 17). Each pulse on line 16 from TC 18 causes antenna 10 to pivot to a successive angular or azimuth position. Antenna 10 moves in successive clockwise positions from some angular position such as 60° left of centerline 10a to some angular position such as 60° right of center-line 10a, then moves to successive positions in the counter-clockwise direction, etc. TC 18 includes means (not shown) such as counter means for continually keeping track of the angular position of antenna 10.

TC 18 is also coupled by a line 24 to the control terminal of RT 12 for purposes of controlling the timing of radar pulses radiated via antenna 10 to the atmosphere. Return signals received at antenna 10 as a result of each pulse transmitted by the antenna 10, are shaped and amplified by RT 12 as is well known to those skilled in the radar art. For a given antenna 10 position the return signals at RT 12, as a function of time, represent atmospheric conditions at increasing distances from the antenna. AD 14 responding to return radar signals from RT 12 converts them to digital signals. For example, in one exemplary embodiment, successive two bit signals are generated which permit differentiation of four distinctive states ranging from representation of the clear sky (which may be represented by the value zero) to a representation of a dense storm cloud (which may be represented by the value three).

AD 14 is coupled via a multiconductor cable to a temporary storage means or buffer such as shift register 32. Shift register 32 is coupled to a memory 40 for storing at selected locations therein data contained in shift register 32. Although in a typical embodiment, shift register 32 may contain 256 separate storage locations or data cells for purposes of description it will be hereafter assumed to contain 10 data cells. Coupled to the control (C) terminal of shift register 32 is a variable oscillator 18a which is included in TC 18. The frequency of oscillator 18a is controlled by a Maximum Range Switch 36. The arrangement of VO 18a and switch 36 is such that, for a given setting of switch 36 indicating a given maximum distance of interest to the radar operator, VO 18a produces pulses at a frequency such that a given number of pulses are applied to shift register 32 during the time required for radar returns to antenna 10, and thus to A/D 14, from the maximum distance of interest.

Although not illustrated, TC 18 is provided with suitable circuitry such as a counter which causes VO 18a to produce a given number, N, of pulses after a pulse has been produced on line 24 and then stop until memory 40 (described below) is ready to accept the data stored in register 32. Then the same given number N of pulses is produced by VO 18a under direction of TC 18 at the rate at which memory 40 accepts data while the counter (not shown) provides a count representative of range of the $\rho$ output terminal of TC 18. Assume, for example, a shift register 32 having a capacity for 10 data cells, and a VO 18a adapted to produce 10 pulses. Assume further a range setting on switch 36 of 50 nautical miles. Therefore, at a given angle or azimuth, after 10 pulses have been produced by VO 18a, shift register 32 contains 10 digital signals in its 10 data cells representing atmospheric conditions at successive 5 nautical mile increments (50 nautical miles divided by 10 pulses=5 nautical miles/pulse).

Figure 2:
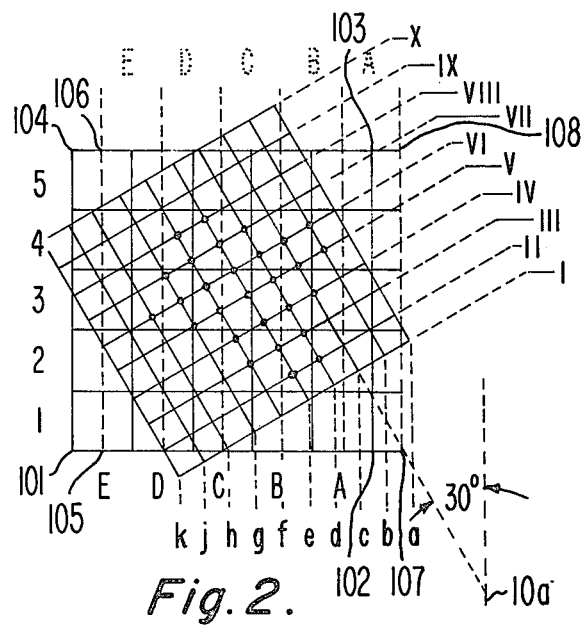
FIG. 2 is a polar grid pattern superimposed with a rectangular grid pattern, a displaced rectangular grid pattern, and a superimposed image.

Memory 40 is typically a random access memory which is arranged functionally (though not necessarily physically in the form of an X and Y matrix comprised of rows and columns of data storage cells, each cell capable of storing two binary digits. Thus, for example, each column of data cells may correspond to one raster scan line of CRT 46 with successive data cells in the memory column corresponding to successive positions along the scan lines. Referring for a moment to FIG. 2, the group of 25 blocks, bounded by peripheral lines extending from 101 to 102, 102 to 103, 103 to 104, and 104 to 101, represent five columns, each of five data cells in memory 40 and five scan lines, each with five distinct locations on face plate 46b of CRT 46 (FIG. 1). For example, blocks A-1 to A-5 represent data in one column comprised of 5 locations or cells in memory 40 and one raster scan line on CRT 46. Memory 40 is connected to a digital-to-analog converter (DA) 42 which converts digital signals stored in memory 40 into corresponding analog signals. DA 42 is coupled to amplifier 44 which, in turn, is coupled to video or intensity modulation terminal 46a of a display means such as a CRT 46 for intensity modulating different portions of display screen 46b thereof.

The time dependent location of the intensity modulation on display screen 46b is determined by signals from sweep circuits 50 applied to X and Y (horizontal and vertical) deflection means 52 which are coupled to CRT 46. The sweep circuits, in turn, are under control of TC 18. The sweep circuits 50, deflection means 52, and CRT 46 are all of conventional design such as the type found in a conventional television receiver. In one preferred embodiment of the invention, the deflection means 52 are rotated 90° about CRT 46 relative to the normal position in a television receiver such that each scan line extends from the bottom of the screen to the top of the screen rather then from the left of the screen to the right of the screen and that successive scan lines appear to the right of preceding scan lines. The sweep circuit may be conditioned to cause a raster scan format to be interlaced or not as desired on display screen 46b.

Output lines 60 and 61 of TC 18 are coupled to OR gates 62 and 64, respectively. The output terminals of OR gates 62 and 64 are coupled, respectively, to the X and Y address lines of memory 40. A read/write line 67 from TC 18 is coupled to memory 40 to condition it for reading or writing. Output lines 60 and 61 respectively provide X and Y addresses to memory 40 during readout therefrom under control of a read signal on read write line 67.

TC 18 is coupled by $\rho$ (range) and $\theta$ (angle) lines respectively to a polar ($\rho$-$\theta$) to rectangular (X-Y) converter 68. A converter ideally suited to the instant application is described in U.S. patent application, Ser. No. 812,363, filed July 1, 1977, by the instant inventor now U.S. Pat. No. 4,106,021 issued Aug. 8, 1978.

Converter 68 receives, from TC 18, on the $\theta$ line, signals representative of the angular position of antenna 10 and therefore the angle associated with the data in shift register 32. Concurrently, converter 68 receives on the $\rho$ line signals representative of the successive ranges of data representing signals in shift register 32, as those data representing signals are transferred from shift register 32 into locations in memory 40, determined by converter 68.

The X and Y output terminals of converter 68 are coupled to adders 72 and 74, respectively, which are part of offset circuit 76. Output terminal X ADDRESS of adder 72 is coupled to one input terminal of OR gate 62 while the output terminal Y ADDRESS of adder 74 is coupled to an input terminal of OR gate 64. Although not shown, TC 18 contains circuitry which determines, as a function of time, which source of addresses, those from adders 72 and 74 or those from TC 18, are applied to memory 40.

An X Offset circuit 78 and Y Offset circuit 80 are coupled to respective input terminals of AND gates 82 and 84. An Antenna Direction signal from TC 18 is coupled to a second input terminal of each of AND gates 82 and 84. The output terminal of AND gate 82 is coupled to adder 72 while the output terminal of AND gate 84 is coupled to adder 74. The operation of gates 82 and 84 is such that when antenna 10 is pivoting in one direction, for example, the counterclockwise direction, AND gates 82 and 84 are primed by the antenna direction signal permitting data from respective X Offset and Y Offset circuits 78 and 80 to be coupled to adders 72 and 74. When antenna 10 is pivoting in the clockwise direction, AND gates 82 and 84 are disabled. In the latter instance, the addresses generated at the X and Y terminals of $\rho$-$\theta$ to X-Y converter 68 are passed directly to OR gates 62 and 64 and thence to memory 40.

X Offset circuit 78 and Y Offset circuit 80 may be relatively simple or relatively complex as dictated by the quality of the image to be displayed on CRT 46. In one working embodiment, X offset circuitry 78 is merely a source of signals indicative of the number 0.5. In the same exemplary embodiment, Y Offset circuit 80 is omitted. Following a description of the operation of the circuit of FIG. 1, alternative X and Y offset circuits 78 and 80 will be described.

The operation of the radar system of FIG. 1 will now be described with the assumption that offset circuit 76 is not operative such that the terminals marked X and Y are respectively the same as the terminals marked X Address and Y Address as by a short-circuit, for example. It will be further initially assumed that antenna 10 is at 30° left of center, that TC 18 is producing a signal at terminal $\theta$, the value of which is indicative of 30°, that a radar pulse has just been radiated from antenna 10, that read/write line 67 is producing a signal indicative of read out of memory 40, that antenna 10 is advancing in the clockwise direction upon receipt of successive pulses on line 16 and that AD 14 produces serially only logic 0 signals indicative of no targets and logic 1 signals indicative of targets. When the operating conditions of these assumptions exist, initially two events occur concurrently. First, data is read out of memory 40 column by column at a first rate for purposes of producing an image on display screen 46b. Second, radar return signals are being received at antenna 10 and stored in register 32 at a second much slower rate.

Memory 40 reads out digital information from successive rows in the same column and then at successive columns all under control of TC 18 which issues Y and X, (row and column) addresses to memory 40 on lines 60 and 61 respectively. Thus, if the memory 40 consists of only 25 locations, as detailed in FIG. 2, read out from E-1, E-2, ... E-5, D-1, D-2, ... A-1, ... A-5, E-1, E-2 ... would occur in order. The information signals which will be either logic 1 or logic 0 signals are converted to analog signals by DA 42. The analog signals represent particular levels of brightness to be displayed on different areas of screen 46b. In the present example, since it has been assumed that only target or no target data is to be displayed, only two levels of brightness (e.g., dark and light) will be displayed. TC 18, which controls the addressing for read out of memory 40, also controls the location on screen 46b of the intensity modulated signals applied at terminal 46a by means of controlling sweep circuits 50 which typically causes a series of vertical sweep lines to appear on screen 46b. In this manner, screen 46b is continually refreshed from memory 40. While screen 46b is being refreshed, a radar return signal is being received at antenna 10 which signal, as a function of time, represents atmospheric conditions at increasing distances from the antenna at an angle of 30° left of center line 10a. The return signal is amplified and shaped by RT 12, then digitized by AD 14 into a succession of logic 1 and logic 0 signals depending on whether at successively increasing distances from the radar, a target or no target is present. Thus the logic 0 and logic 1 signals in combination, continually represent the analog signal received at antenna 10. VO 18a, under control of the maximum range switch 36, which determines the period of VO 18a, and under control of the R/T trigger on line 24 produces periodic momentary pulses. These momentary pulses are applied to the clock (C) terminal of shift register 32 to clock logic signals into and through the register until the register is full.

After VO 18a has produced ten pulses to load ten data cells representing meteorological conditions at ten spaced points, the contents are available to be transferred to memory 40. It will be recalled that the period of the clock pulses from VO 18a is determined by the setting of maximum range switch 36 which setting is determined by the maximum range of interest to the operator. The speed of loading register 32 relative to the refresh rate of screen 46b is such that its loading will be completed while the screen is being refreshed. When register 32 is loaded and while thereafter a retrace of the CRT 46 electron beam back to the beginning of the scan on screen 46b is occurring, the read/write line 67 in TC 18 produces a signal which causes memory 40 to be conditioned for receiving information from shift register 32 and causes VO 18a to produce pulses for shift register 32 compatible with the loading speed of memory 40. Concurrently, TC 18 sends signals to converter 68 representative of the angle, 30°, and sends signals indicative of successive ranges as clock pulses are sent to shift register 32 from VO 18a. It will be recalled that shift register 32 contains data indicative of various meteorlogical conditions at successive ranges at the 30° azimuth position.

Refer to FIG. 2 in which ten successive azimuth lines a, b, c, ... k corresponding to antenna angle of approximately 30° from central line 10a are shown. If line c corresponds exactly to an antenna angle of 30°, lines d, e, f, g, h, j, and k correspond to antenna angles greater than 30° while lines b and a correspond to antenna angles less than 30°. It should be noted that for drawing convenience, all lines a-k are drawn parallel whereas, in fact, they converge to an origin beyond the lower right corner of FIG. 2. Lines I, II, III . . . X represent different ranges with line I representing a range nearer the origin while lines II, III and so forth represent successively more distant ranges from the origin. Although in reality lines I, II, III . . . X are curvilinear, for convenience in drawing, they are illustrated as straight lines. A dot at the intersection of a range and angle line represents a target (represented in shift register 32 by a logic 1) while the absence of a dot corresponds to the absence of a target (represented in shift register 32 as a logic 0). Thus, on line c, targets exist at ranges IV, V, and VI, while no target exists at ranges I, II, III, VII, VIII, IX, and X.

As the logic 0 for range I at angle c contained in the tenth storage position of shift register 32 is transferred to memory 40 (and concurrently all remaining data in shift register 32 is shifted one position), converter 68 computes a memory address of A-2. It will be noted that this follows since the c-I intersection falls in block A-2. Therefore, a logic 0 is transferred to memory location A-2. Upon the occurrence of the next logic pulse from VO 18a, converter 68 also computes an address A-2 corresponding to intersection c-II causing a logic 0 signal to be shifted to memory location A-2. For the next range, range III, a memory location of A-3 is computed and a logic 0 is inserted therein. For the next range, range IV, a memory address of A-3 is also computed; a logic 1 is transferred to memory location A-3 replacing the logic 0 previously placed therein. In like manner, memory addresses for ranges V-X are computed by converter 68 and appropriate signals are transferred from shift register 32 to memory 40. Following the loading of memory from shift register 32, read/write line 67 again conditions memory for reading to continue the refreshing of CRT 46. Concurrently, antenna 10 is positioned to a new angle closer to antenna center line 10a corresponding to line b, FIG. 2. Thereafter, shift register 32 is loaded with signals corresponding to signals received at antenna 10 from the various range points I-X.

When memory 40 is thereafter conditioned to write, converter 68 generates memory addresses while the contents of register 32 are transferred to memory 40 as described above in connection with line c. In particular, since no target exists at coordinates b-III and b-IV, the last two coordinates corresponding to memory location A-3, memory location A-3 will be loaded with a logic 0. It previously was loaded with a logic 1 since a target exists at coordinate C-IV, the previous coordinate to be written into memory location A-3.

After antenna 10 has moved to its extreme clockwise position (60° to the right of center line 10a in one exemplary embodiment) it begins to move counterclockwise during which time, in the absence of offset circuit 76, the actions above-described repeat. In particular, with reference to memory location A-3, the last coordinates, the contents of which are to be written into memory location A-3, is c-IV. A target exists at c-IV. Therefore, a logic 1 is written into memory location A-3 which following clockwise rotation of antenna 10 contained a logic 0. Similar changes occur in different ones of the memory locations; some changing from a logic 1 to a logic 0 and some changing from a logic 0 to a logic 1.

The net effect of such action is a shift of the image on screen 46b, FIG. 1 which is undesirable.

Figure 3:
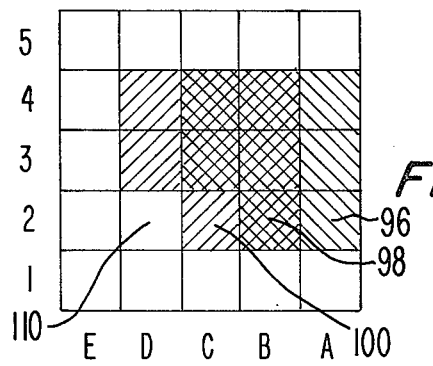
FIG. 3 is a rectangular grid pattern with the image of FIG. 2 as it appears in the absence of the present invention.
Figure 5:
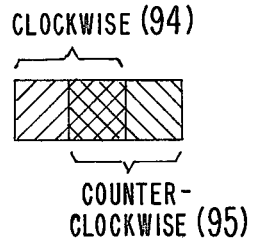
FIG. 5 is a legend useful in understanding FIGS. 3 and 4.

FIG. 3 in conjunction with legend FIG. 5, illustrates the contents of memory 40 after clockwise (94) and counterclockwise (95) rotations. A block 96 such as A-2 indicates a logic 0 after a clockwise rotation, and a logic 1 after a counterclockwise rotation. A block 98 such as B-2 indicates a logic 1 after both clockwise and counterclockwise rotations. A block 100 such as C-2 indicates a logic 1 after a clockwise rotation but a logic 0 after a counterclockwise rotation. A block 110 such as D-2 indicates a logic 0 after both clockwise and counterclockwise rotations of antenna 10.

For the reasons described above and by reviewing FIG. 2, it will be noted that blocks A-2, A-3, and A-4, C-2, D-3, and D-4 change values depending on clockwise or counterclockwise rotation. On the screen 46b, these changes are manifested as a small shift in the image at the frequency of the antenna direction shift. Such an image shift, although small, has been found annoying to viewers.

Offset circuit 76, FIG. 1, materially reduces such undesired image shifts. In general, offset circuit 76 slightly alters the addresses computed by converter 68 during one of clockwise or counterclockwise rotations of antenna 10. As described in connection with the aforementioned application, Ser. No. 812,363, converter 68, FIG. 1, (many of the elements including converter 68 are identically numbered in the copending application and the instant application) computes for each given angle associated with data in shift register 32, an X and Y memory address for each range. The computation of the X memory address is performed as follows. A fractional number, predetermined for each angle to which antenna 10 is positionable, is repeatedly added in an adder (not shown) forming a whole number and fractional number which increases in value as each addition occurs. Each addition computes the address for the next successive range. The whole numbers so computed are utilized as the X address for memory 40. The Y address is computed similarly utilizing a different predetermined number. In the instant application, the whole and fractional numbers for the X address are passed to adder 72, while the whole and fractional numbers for the Y address are passed to adder 74 to be added to fixed numbers contained in X offset 78 and Y offset 80, FIG. 1.

In one particular embodiment, in wich the number of columns in memory 40 is approximately which the number of angles, to which antenna 10 may be positioned (the condition illustrated in FIG. 2) an X offset 78 value of 0.5 was chosen. In the same embodiment, in which the area on screen 46b, FIG. 1, of interest to the viewer extends not appreciably beyond 30° either side of a center line, a Y offset value of 0.0 was chosen.

For example, if for a particular range and angular condition, converter 68 generates an X value of 3.7 and AND gate 82 is disabled, memory column 3 will be addressed. Conversely, if converter 68 generates the same X value 3.7 and additionally AND gate 82 is enabled, adder 72 will add 3.7 from converter 68 to 0.5 from offset circuit 78 to produce a value 4.2 causing memory column 4 to be addressed. The effect of adding the offset value to the computed X addresses is as though the memory matrix in FIG. 2 is moved to the right one half of a memory space as illustrated by the dashed vertical lines bounded by lines 105-106 and 107-108. It will be noted that there is no vertical displacement of the memory matrix since in the exemplary embodiment, no Y offset is provided.

Figure 4:
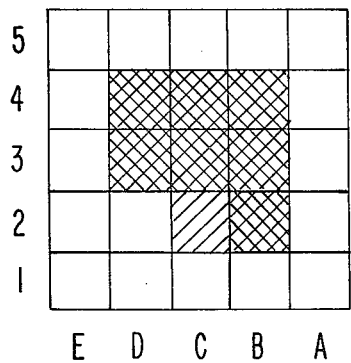
FIG. 4 is a rectangular grid pattern with the image of FIG. 2 as it appears utilizing the present invention.

FIG. 4 illustrates the contents of memory 40 with the addition of offset circuit 76. Note that there is perfect correlation of memory content between clockwise and counterclockwise rotation of antenna 10 except for memory location C-2. This is a considerable improvement over the condition illustrated in FIG. 3 in the absence of offset circuit 76.

A number of modifications of offset circuit 76 are possible depending on the circumstances. For example, if areas beyond 45° left and right of a center line are of interest to a viewer, an additional coupling between TC 18 and AND gates 82 and 84 may be effected such that for angles less than 45°, only AND gate 82 is primed while, for angles greater than 45°, only AND gate 84 is primed.

What is claimed is:

1. In a system for producing from signals representing first addresses in a first coordinate system corresponding signals representing second addresses in a second coordinate system which has fewer addresses than has said first coordinate system comprising in combination:
   means receptive of said signals representing successive ones of said first addresses in either a first sequence or a second different sequence for producing corresponding signals representing said second addresses in accordance with the relationship between said first coordinate system and said second coordinate system and for producing a signal representing a given second address for more than one first address;
   means responsive to said signals representing said first addresses being received in said first sequence for producing a signal indicative thereof; and
   means responsive to said sequence indicative signal for changing said corresponding signals representing said second addresses by a predetermined amount.

2. The combination as set forth in claim 1 wherein said means for producing said corresponding signals includes means receptive of signals representing addresses in a polar coordinate system for producing signals representing addresses in a rectangular coordinate system.

3. The combination as set forth in claim 1 wherein said signals representing said first addresses in said first coordinate system are produced by a radar system which comprises a pivoting antenna for transmitting and receiving signals at radar frequencies and wherein said means responsive to said signals representing said addresses being received in said first sequence further includes means responsive to the position of said antenna for producing said first address signals, said first address signals being indicative of various azimuths to which said antenna is pivoted and indicative of range at each of said azimuths.

4. The combination as set forth in claim 3 wherein said radar system further includes means receptive of said radar frequency receiving signals for producing digital signals corresponding thereto and further including addressable memory means receptive of said digital signals and said second coordinate system addresses for storing said digital signals at said second addresses.

5. The combination as set forth in claim 3 wherein said means for changing said corresponding signals comprises adder means receptive of said second addresses and further comprises means coupled to said adder means for supplying a constant value thereto whereby said changed addresses provided by said adder means comprise said second addresses each added to said constant.

* * * * *